(12) United States Patent
Yabe et al.

(10) Patent No.: US 10,353,690 B2
(45) Date of Patent: Jul. 16, 2019

(54) DEVICE MANAGEMENT APPARATUS, MANAGEMENT PROGRAM UPDATE METHOD AND NON-TRANSITORY RECORDING MEDIUM

(71) Applicant: Mitsubishi Electric Corporation, Tokyo (JP)

(72) Inventors: Masaaki Yabe, Tokyo (JP); Ichiro Maruyama, Tokyo (JP); Satoshi Minezawa, Tokyo (JP); Hirotoshi Yano, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/124,561

(22) PCT Filed: Jul. 31, 2014

(86) PCT No.: PCT/JP2014/070184
§ 371 (c)(1),
(2) Date: Sep. 8, 2016

(87) PCT Pub. No.: WO2016/016991
PCT Pub. Date: Feb. 4, 2016

(65) Prior Publication Data
US 2017/0017482 A1    Jan. 19, 2017

(51) Int. Cl.
*G06F 9/445*    (2018.01)
*G06F 8/65*    (2018.01)
*G06F 11/00*    (2006.01)

(52) U.S. Cl.
CPC .............. *G06F 8/65* (2013.01); *G06F 11/00* (2013.01)

(58) Field of Classification Search
USPC .................................................. 717/170, 171
See application file for complete search history.

(56) References Cited

U.S. PATENT DOCUMENTS 8,738,753 B2 * 5/2014 Devraj .............. G06F 17/30306
709/223
2004/0148379 A1    7/2004 Ogura
(Continued)

FOREIGN PATENT DOCUMENTS

CN    101089815 A    12/2007
JP    04-219822 A    8/1992
(Continued)

OTHER PUBLICATIONS

Office Action dated Jan. 17, 2017 issued in the corresponding Japanese Patent Application No. 2016-537673 (and partial English translation).
(Continued)

*Primary Examiner* — Chuck O Kendall
(74) *Attorney, Agent, or Firm* — Posz Law Group, PLC

(57) ABSTRACT

A device management apparatus is configured to set a first update time to execute a first update procedure to update a running management program, for managing one or multiple devices in a management target area, to a new management program at a time outside a scheduled time of execution of a specific procedure. The device management apparatus is configured to execute the first update procedure at the set first update time. The specific procedure includes procedures to control the devices on a device schedule, periodic procedures executed by a periodic processor of the device management apparatus, and the like.

17 Claims, 18 Drawing Sheets

(56) References Cited

U.S. PATENT DOCUMENTS

| | | |
|---|---|---|
| 2007/0192763 A1 | 8/2007 | Helvick |
| 2007/0288423 A1 | 12/2007 | Kimoto |
| 2008/0148268 A1 | 6/2008 | Hirouchi |
| 2008/0163227 A1 | 7/2008 | Son et al. |
| 2009/0089777 A1 | 4/2009 | Fuller et al. |
| 2011/0093093 A1 | 4/2011 | Yang et al. |
| 2011/0185197 A1 | 7/2011 | Ukita et al. |
| 2011/0307882 A1 | 12/2011 | Shiba |
| 2012/0060151 A1 | 3/2012 | Oh et al. |
| 2013/0096737 A1 | 4/2013 | Suganuma et al. |

FOREIGN PATENT DOCUMENTS

| | | | |
|---|---|---|---|
| JP | 2004-139572 A | 5/2004 | |
| JP | 2008-299800 A | 12/2008 | |
| JP | 2009-271603 A | 11/2009 | |
| JP | 2010-217989 A | 9/2010 | |
| JP | 2011-150664 A | 8/2011 | |
| JP | 2012-014253 A | 1/2012 | |
| JP | 2012-230592 A | 11/2012 | |
| JP | 2012-238180 A | 12/2012 | |
| JP | 2014-016815 A | 1/2014 | |

OTHER PUBLICATIONS

International Search Report of the International Searching Authority dated Mar. 10, 2015 for the corresponding International application No. PCT/JP2014/070184 (and English translation).
Extended European Search Report dated Jun. 26, 2018 issued in corresponding EP patent application No. 14898527.8.
Office Action dated Sep. 3, 2018 issued in corresponding Chinese patent application No. 201480079406.1 (and English translation).
Office Action dated Feb. 25, 2019 issued in corresponding Chinese patent application No. 201480079406.1 (and English translation).
Extended European Search Report dated Oct. 19, 2018 issued in corresponding European divisional patent application No. 18175749.3.

* cited by examiner

| DEVICE SCHEDULE DATA | | |
|---|---|---|
| TARGET DEVICE | CONTROL CONTENTS | CONTROL TIME |
| AIR CONDITIONER 1 | PRECOOLING | 2014/07/01 04:30 |
| AIR CONDITIONER 1 | AIR CONDITIONING | 2014/07/01 06:00 |
| ALL | STOP | 2014/07/01 09:00 |
| AIR CONDITIONER 1 | PRECOOLING | 2014/07/01 15:30 |
| AIR CONDITIONER 1 | AIR CONDITIONING | 2014/07/01 17:00 |
| AIR CONDITIONER 2 | PRECOOLING | 2014/07/01 19:30 |
| TV, AIR CONDITIONER 1 | STOP | 2014/07/01 21:00 |
| AIR CONDITIONER 2 | AIR CONDITIONING | 2014/07/01 21:00 |
| AIR CONDITIONER 2 | STOP | 2014/07/01 22:30 |

DEVICE MANAGEMENT APPARATUS, MANAGEMENT PROGRAM UPDATE METHOD AND NON-TRANSITORY RECORDING MEDIUM

CROSS REFERENCE TO RELATED APPLICATION

This application is a U.S. national stage application of International Patent Application No. PCT/JP2014/070184 filed on Jul. 31, 2014, the content of which is incorporated herein by reference.

TECHNICAL FIELD

The present disclosure relates to a device management apparatus, management program update method, and non-transitory recording medium.

BACKGROUND

Use of home energy management systems (HEMSs) for managing energy consumption in houses is becoming widespread. The HEMS includes a device management apparatus wirelessly communicating with devices installed in a house or the like. The device management apparatus executes a management program continuously for almost 24 hours to manage the devices installed in the house. The management program is a program executed by the device management apparatus for controlling the devices, and is generally updated as appropriate for addition, deletion, or change of functions, or for correction of defects.

Techniques are proposed regarding update of programs executed by devices (for example, Patent Literature 1 and 2), and techniques are proposed regarding update of programs executed by power management apparatuses (for example, Patent Literature 3).

For example, the Patent Literature 1 discloses a controller device counting the use/non-use of radio waves in each time slot, sending to a household electric appliance an electronic message to start a process of storing a new update program during a time slot having the lowest time-slot count, and starting transmission of the update program.

For example, the Patent Literature 2 discloses rescheduling of reserved operation times of multiple household electric appliances so as to ensure that the time slot for which none of the multiple household electric appliances are reserved for timer operation is equal to or larger than the minimum time necessary for updating the programs of program-update target household electric appliances.

For example, the Patent Literature 3 discloses one-apparatus-at-a-time isolation of N cooperating power management apparatuses, in order to update software.

PATENT LITERATURE

Patent Literature 1: Unexamined Japanese Patent Application Kokai Publication No. 2012-230592;
Patent Literature 2: Unexamined Japanese Patent Application Kokai Publication No. 2012-238180; and
Patent Literature 3: Unexamined Japanese Patent Application Kokai Publication No. 2011-150664.

The technique regarding update program transmission time determination disclosed in the Patent Literature 1 is taken to be applied to management program update time determination executed by a device management apparatus. In such a case, for example, a running program is presumably updated in a time slot during which the usage of radio waves is low. However, generally a device management apparatus may control the operation of a device with a relatively small amount of communication. Therefore, if the technique disclosed in the Patent Literature 1 is applied to program update time determination executed by a device management apparatus, the device management apparatus may become unable to control operation of the device.

Moreover, since a device management apparatus is almost always in operation as described above, the techniques described in Patent Literature 2 and 3 are difficult to apply to program update executed by a device management apparatus.

SUMMARY

The present disclosure is made to solve the above problem, and an objective of the disclosure is to provide a device management apparatus and the like that enables suppression of the effect of update of running management programs on the operation of the device management apparatus for energy consumption management.

In order to achieve the above objective, the device management apparatus according to the present disclosure includes:

a first update time setter configured to set a first update time to a time outside a scheduled time of execution of a specific procedure, the first update time being a time of execution of a first update procedure to update a running management program to a new management program, the running management program being for managing one or more devices in a management target area; and an updater configured to execute the first update procedure at the first update time set by the first update time setter.

According to the present disclosure, the first update time is set to a time outside a scheduled time of execution of a specific procedure and the first update procedure to update the running management program to a new management program is executed at the first update time. As a result, influence of the first update procedure on a specific procedure, such as failed execution of the specific procedure because of execution of the first update procedure, can be suppressed. This thus enables suppression of influence of update of the running management program on the operation of the device management apparatus for energy consumption management.

BRIEF DESCRIPTION OF DRAWINGS

FIG. 8 is a chart showing an example of device schedule data;

DETAILED DESCRIPTION

An embodiment of the present disclosure will be described with reference to the drawings. In all the drawings, the same elements are referred to by the same reference numbers.

Figure 1:
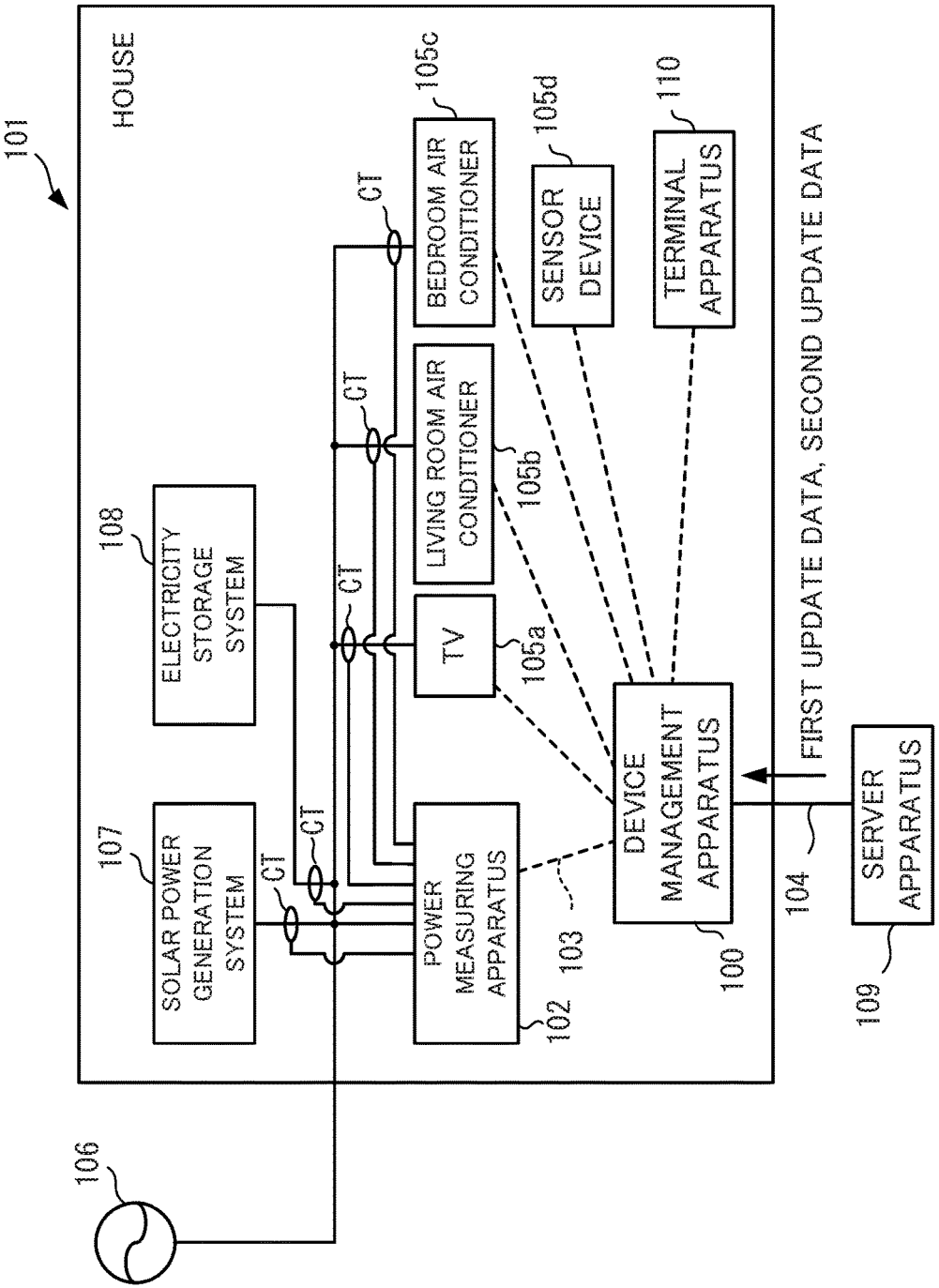
FIG. 1 is a diagram showing the configuration of an HEMS including a device management apparatus according to an embodiment of the present disclosure.

A device management apparatus 100 according to an embodiment of the present disclosure is, as illustrated in FIG. 1, an apparatus constituting a home energy management system (HEMS) 101 for managing energy consumption in a house. Here, a house is an example of the area the device management apparatus 100 manages (the management target area), and the management target area may be a facility, building rental property, or the like.

The device management apparatus 100 physically includes a central processing unit (CPU), random access memory (RAM), read only memory (ROM), flash memory, communication interface, touch panel, and the like, and executes a management program saved in, for example, a flash memory. Moreover, the device management apparatus 100 communicates with power-operated devices, a power measuring apparatus 102 measuring the power consumption, and the like via a home network 103. The device management apparatus 100 acquires data as appropriate via the home network 103 and a wide area network 104 such as the Internet, while executing the management program to monitor and control the power consumption in the house, operation of devices installed in the house, and the like.

In the present embodiment, the devices installed in the house are, as illustrated in FIG. 1, a television receiver (TV) 105a, a living room air conditioner 105b, a bedroom air conditioner 105c, and a sensor device 105d. The living room air conditioner 105b is an air conditioner installed in a living room, and the bedroom air conditioner 105c is an air conditioner installed in a bedroom. Here, the living room and bedroom are examples of rooms or sections of the house. The sections are several individual spaces into which the management target space is divided.

In the following explanation, when collectively referred to, the TV 105a, living room air conditioner 105b, bedroom air conditioner 105c, and sensor device 105d are termed "devices 105". Moreover, when collectively referred to, the living room air conditioner 105b and bedroom air conditioner 105c are termed "air conditioners 105b and 105c".

Here, the devices 105 are household electric appliances, equipment items, and the like, and not limited to the TV 105a, air conditioners 105b and 105c, and sensor device 105d. The devices 105 may be, for example, an electric water heater, induction heating (IH) cooking heater, lighting fixtures, or the like. Moreover, the number of devices 105 may be any number greater than or equal to 1.

As illustrated in FIG. 1, the TV 105a and air conditioners 105b and 105c are connected to a house power supply wiring. The TV 105a and air conditioners 105b and 105c are supplied with, and operate by using, power for operating from a commercial power source 106, a solar power generation system 107 receiving sunlight and generating power, and an electricity storage system 108 charging/discharging power via the house wiring.

The sensor device 105d includes various sensors and sends to the device management apparatus 100 data indicating detection or measurement results of the sensors via the home network 103. The sensor device 105d according to the present embodiment is a battery-operated motion sensor and outputs motion detection data indicating whether somebody is present in a specific room that is a monitoring target area of the sensor device 105d. Here, the sensor device 105d may be connected to the house wiring and operate with power supplied via the house wiring.

The electricity storage system 108 is, for example, an electric vehicle charging/discharging system, stationary electricity storage system, and the like.

The power measuring apparatus 102 acquires current data, indicating the values of currents flowing through branch lines of the house wiring, from current sensors CT arranged at the branch lines as illustrated in FIG. 1. The power measuring apparatus 102 measures the power generation of the solar power generation system 107, the charging/discharging amount of the electricity storage system 108, the power consumption of the devices 105, and the like on the basis of the current data acquired from the current sensors CT and the voltage value of the house wiring. The power measuring apparatus 102 sends to the device management apparatus 100 data including the measured values and values that are based on measurement results, such as totals of the measured values and the like.

The server apparatus 109 communicates with the device management apparatus 100 via the wide area network 104 to manage various types of data the device management apparatus 100 holds and to send various types of data to the device management apparatus 100.

For example, as illustrated in FIG. 1, the server apparatus 109 sends to the device management apparatus 100 first update data for updating the management program executed by the device management apparatus 100. Moreover, the server apparatus 109 sends to the device management apparatus 100 second update data for updating device programs executed by the devices 105.

Here, the management program is a software program executed by the device management apparatus 100. By executing the management program, the device management apparatus 100 monitors and controls the devices 105 and thereby manages the energy consumption in the house. The device management apparatus 100 downloads (acquires) latest first update data from the server apparatus 109. Then, the device management apparatus 100 updates the running management program to a new management program on the basis of the first update data at a first update time set by the device management apparatus 100 (the first update procedure).

"The new management program (a new management program based on the first update data)" is, for example, the first update data itself in the case in which the first update data is a management program replacing the entire running management program. Moreover, for example, when the first update data is the difference between the running management program and the new management program, "the new management program" is a management program obtained by applying the first update data to the running management program.

Moreover, the device programs are software programs executed by the devices 105 for fulfilling the functions of the devices 105 or devices connected to the devices 105 as appropriate (for example, communication adaptors for communicating via the home network 103).

The second update data for updating a device program, for example, is uploaded to the server apparatus 109 by the manufacturer of a device (an update target device) 105 executing the update target device program, or the like, and the device management apparatus 100 downloads the second update data from the server apparatus 109. The device management apparatus 100 sends the second update data, or a new device program that is based on the second update data, to the update target device 105 among the devices 105. The device management apparatus 100 sends to the update target device 105 an instruction including a second update time set by the device management apparatus 100. The device 105 that has received the instruction then updates the running device program to the new device program, on the basis of the second update data at the second update time included in the instruction (the second update procedure).

"The new device program (a new device program that is based on the second update data)" is, for example, the second update data itself when the second update data is a device program replacing the entire running device program. Moreover, for example, when the second update data is the difference between the running device program and a new device program, "the new device program" is a device program obtained by applying the second update data to the running device program.

A terminal apparatus 110 is a tablet terminal, smartphone, or the like that is carried by a user of the device management apparatus 100. The terminal apparatus 110 communicates with the device management apparatus 100 via the home network 103 within the house and communicates with the device management apparatus 100 via the wide area network 104 outside the house. Moreover, the terminal apparatus 110 executes a preinstalled software program to provide a user interface to the device management apparatus 100. This configuration enables the user, by operating the terminal apparatus 110, to give various instructions to the device management apparatus 100 and to even remotely operate the devices 105 via the device management apparatus 100.

Here, the home network 103 and wide area network 104 may be configured using wired and/or wireless lines.

Figure 2:
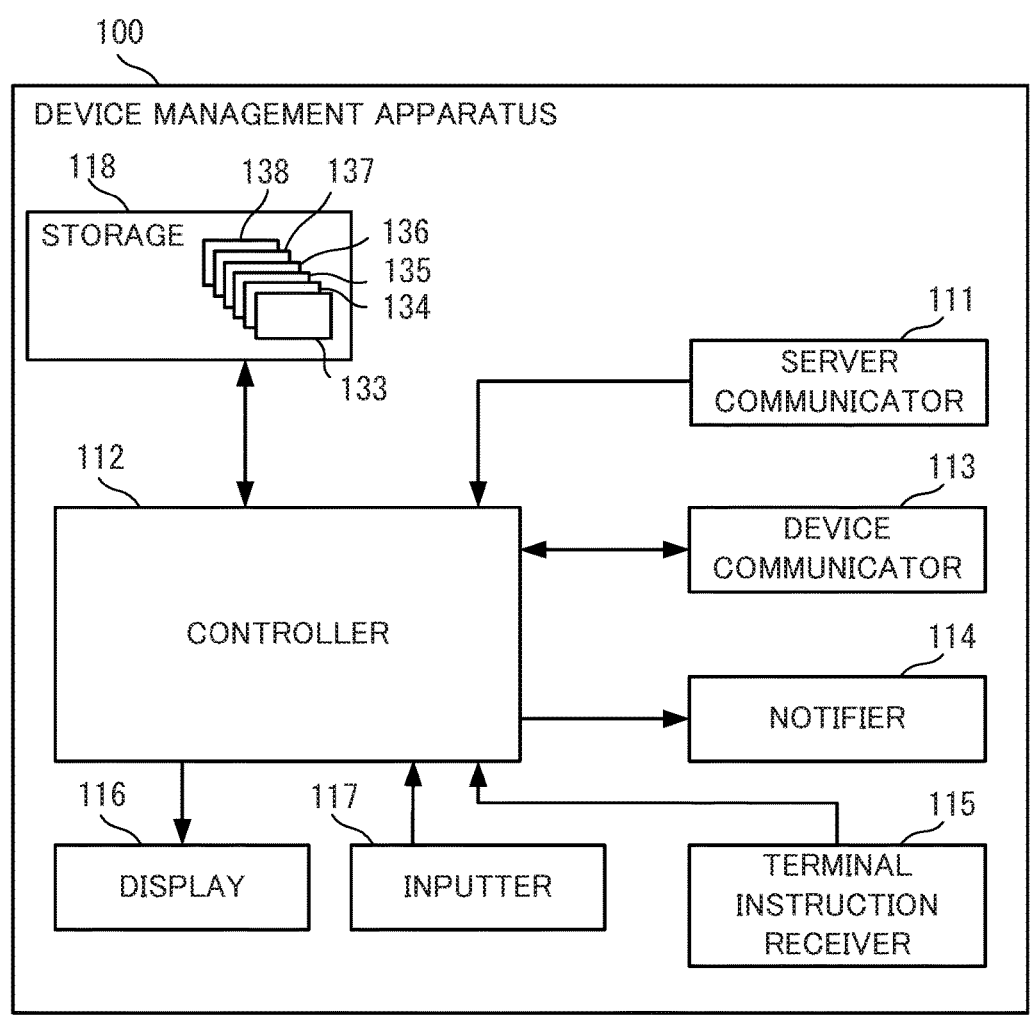
FIG. 2 is a diagram showing the functional configuration of the device management apparatus according to the embodiment.

The device management apparatus 100 according to the present embodiment is functionally equipped with, as illustrated in FIG. 2, a server communicator 111 that is an interface for communicating with the server apparatus 109, a controller 112 that executes various controls, a device communicator 113 that is an interface for communicating with the devices 105, a notifier 114 that notifies the user's terminal apparatus 110 of various kinds of information, a terminal instruction receiver 115 that receives user instructions via the terminal apparatus 110, a display 116 that displays images, an inputter 117 that receives instructions from the user on the basis of input, and a storage 118 that stores various data.

Figure 3:
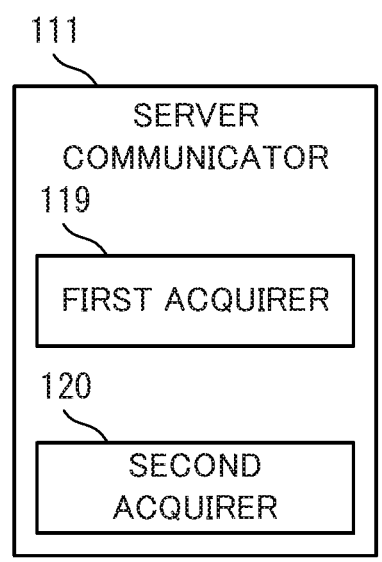
FIG. 3 is a diagram showing the functional configuration of a server communicator according to the embodiment.

The server communicator 111 includes, as illustrated in FIG. 3, a first acquirer 119 that acquires the first update data from the server apparatus 109, and a second acquirer 120 that acquires the second update data from the server apparatus 109.

Figure 4:
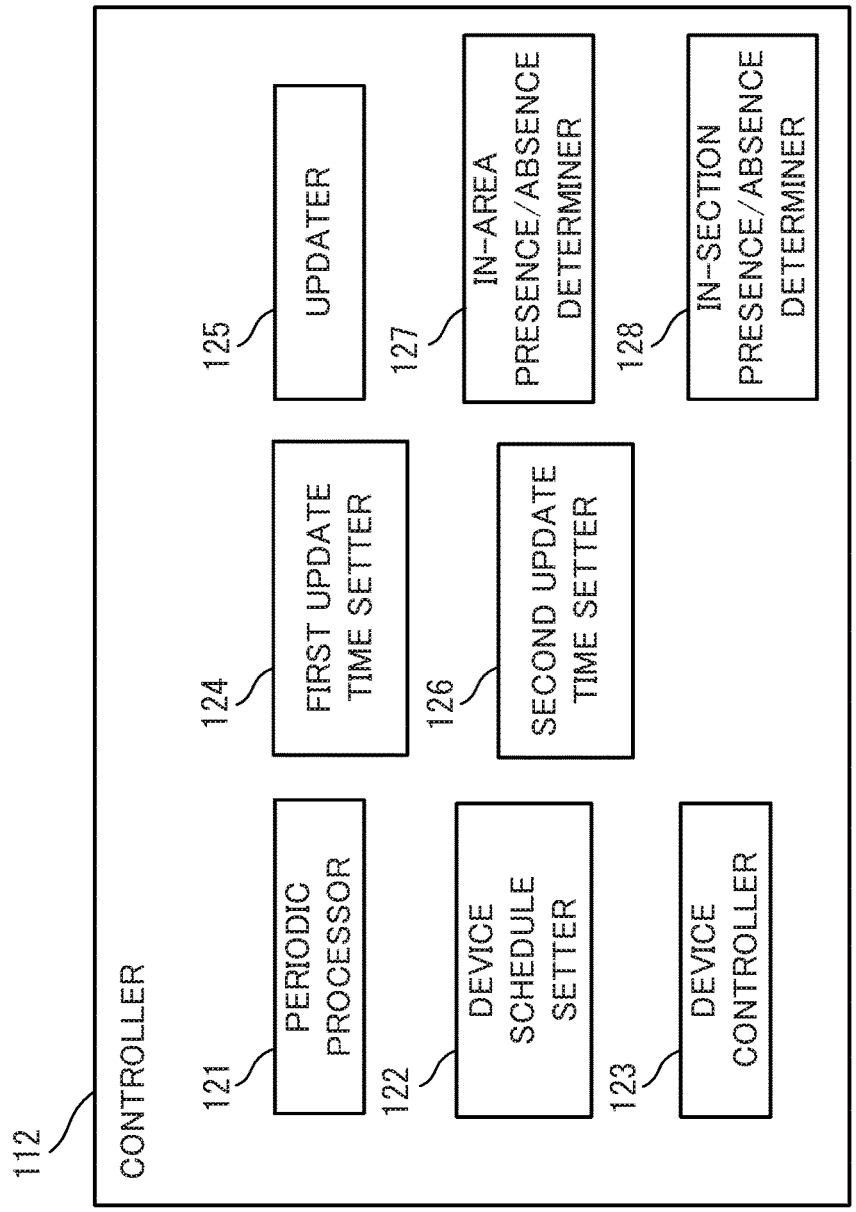
FIG. 4 is a diagram showing the functional configuration of a controller according to the embodiment.

The controller 112 includes, as illustrated in FIG. 4, a periodic processor 121 executing periodic procedures, a device schedule setter 122 setting a device schedule in accordance with a user schedule, a device controller 123 controlling the devices 105, a first update time setter 124 setting the first update time, an updater 125 executing the first update procedure at the first update time, a second update time setter 126 setting the second update time, an in-area presence/absence determiner 127 judging whether the user is present in the house, and an in-section presence/absence determiner 128 judging whether the user is present in a specific room.

The periodic processor 121 periodically executes procedures to tally the power consumption in the house, monitor the operation states of the devices 105, tally the electricity bill, synchronize data held both by the server apparatus 109 and by the device management apparatus 100, and the like.

In the present embodiment, the procedures to tally the power consumption, tally the electricity bill, and synchronize the data (hereinafter, referred to collectively as "the periodic procedure 1") are executed once a day at 1:30 AM. Moreover, the procedure to monitor the devices 105 ("the periodic procedure 2" hereafter) is executed every hour.

Here, the periodic procedures may be any procedures that are periodically executed for managing the devices 105, and are not limited to the above examples. Moreover, the interval, time, day, date and the like of execution of the periodic procedures can be determined as appropriate.

The device schedule setter 122 sets a device schedule in accordance with a user schedule under predetermined rules. The user schedule is a schedule of the user that specifies the identity of the user, an action of the user, and when the user does the action. The rules define what kind of device schedule is created in relation to what kind of user schedule. The device schedule is a schedule regarding device control, and specifies what type of control is executed, which device is subject to the control, and when the control is executed.

Examples of the rules include the following Rules 1 to 4.

(Rule 1) Operate the living room air conditioner 105b at the wake-up time.

(Rule 2) When all user family members are scheduled to be away from home, stop all devices 105 at the time of departure from the home, and run the living room air conditioner 105b at the time of return to the home.

(Rule 3) Stop all devices 105 in the living room (namely the TV 105a and living room air conditioner 105b) at the time of going to bed, and operate the bedroom air conditioner 105c for 90 minutes from the time of going to bed.

(Rule 4) When the air conditioners 105b and 105c are to be operated in accordance with the user schedule, always starting precooling/preheating 90 minutes before starting the air-conditioning/heating operation of the air conditioners 105b and 105c.

The device schedule is drafted by application of such rules to the user schedule.

The device controller 123 controls the devices 105 in accordance with the device schedule created by the device schedule setter 122. Moreover, the device controller 123 controls the devices 105 in accordance with the contents of instructions received by the inputter 117 or terminal instruction receiver 115.

The first update time setter 124 sets the first update time to a time outside a scheduled time of a specific procedure. The specific procedure is a procedure to control a device 105 in accordance with the device schedule, a periodic procedure executed by the periodic processor 121, a sequence control procedure executed by the device management apparatus 100, for example, for feedback control during the precooling or preheating operation of the air conditioners 105*b* and 105*c*, or the like. The first update time setter 124 may estimate the time required for executing the first update procedure (the first update execution time) based, for example, on the data volume of the first update data, and may exclude, from the specific procedure for determining the first update time, a periodic procedure for which the period is shorter than the estimated first update execution time. The first update time is expressed by, for example, date and time, and the like. Here, the first update time may be expressed by a relative time, with respect to any one of the specific procedures, and the like.

Moreover, the first update time setter 124 sets the first update time so that the first acquirer 119 completes acquisition of the first update data by the first update time.

Furthermore, the first update time setter 124 sets the first update time so that the new management program is stored in the storage 118 by the first update time.

Furthermore, the first update time setter 124 sets the first update time to a time at which the user is forecast to be absent from the house on the basis of the user schedule.

Moreover, when the in-area presence/absence determiner 127 determines that the user is present in the house at a predetermined time prior to the set first update time, the first update time setter 124 re-sets the first update time to a time subsequent to (later than) the set first update time. Similarly, when the inputter 117 or terminal instruction receiver 115 receives a user instruction at a predetermined time prior to the set first update time, the first update time setter 124 re-sets the first update time to a time subsequent to (later than) the set first update time. Here, "the predetermined time" may be set as appropriate, and is 30 minutes in the present embodiment.

The updater 125 executes the first update procedure at the first update time that was last set by the first update time setter 124. In other words, when the first update time is re-set by the first update time setter 124, the first update procedure is not executed at the previously set first update time.

Specifically, the updater 125 saves a new management program in the storage 118. The updater 125 further executes, as the first update procedure, the new management program upon restart, for example, following the end of execution of the running management program.

The second update time setter 126 sets the second update time for an update target device 105 to a time outside a scheduled execution time of a specific procedure targeting the update target device 105.

The specific procedure is the same as the above-described specific procedures. For example, when the specific procedure is a procedure to control a device 105 in accordance with the device schedule, the specific procedure targeting the update target device 105 is a procedure to control the update target device 105 in accordance with the device schedule in which the control target is the control target device 105. Moreover, for example, when the specific procedure is the periodic procedure 2, the specific procedure targeting the update target device 105 is a procedure to monitor the operation and the like of the update target device 105. Like the first update time setter 124, the second update time setter 126 may estimate the time required for executing the second update procedure (the second update execution time) based, for example, on the data volume of the second update data, and may exclude, from the specific procedure for setting the second update time, the periodic procedure for which the period is shorter than the estimated second update execution time.

The second update time is expressed by, for example, a date and time, and the like. Here, the second update time may be expressed by, for example, a relative time with respect to any one of the specific procedures.

Moreover, the second update time setter 126 sets the second update time for each of the update target devices 105 so that the second acquirer 120 completes acquisition of the second update data for updating the device program executed by the update target device 105 by the second update time.

Furthermore, the second update time setter 126 sets the second update time for each of the update target devices 105 so that the second update data for updating the device program executed by the update target device 105 is stored in the storage 118 by the second update time.

Furthermore, the second update time setter 126 sets the second update time for each of the update target devices 105 to a time at which the user is forecast to be absent from the room where the update target device 105 is installed, on the basis of the user schedule.

Furthermore, when the in-section presence/absence determiner 128 determines that the user is present in a specific room at a predetermined time prior to the set second update time, the second update time setter 126 re-sets the second update time to a time subsequent to (later than) the set second update time for the update target device 105 installed in the specific room. Similarly, when the update target device 105 receives a user operation at a predetermined time prior to the set second update time, the second update time setter 126 re-sets the second update time to a time subsequent to (later than) the set second update time for the update target device 105 having received the user operation. Here, "the predetermined time" may be set appropriately, and is set to 30 minutes in the present embodiment. Moreover, "the user operation" is a user operation with respect to the update target device 105 and includes operations such as an operation on the update target device 105 via the device management apparatus 100, and a direct operation of the user on the update target device 105 using a dedicated remote controller.

The in-area presence/absence determiner 127 determines whether the user is present in the house prior to the first update time set by the first update time setter 124 on the basis of in-area presence/absence data indicating a value varying depending on whether the user is present in the house and the like.

Specifically, the in-area presence/absence determiner 127, on the basis of the in-area presence/absence data, from 30 minutes prior to the first update time set by the first update time setter 124, continuously determines whether the user is present in the house. The in-area presence/absence determiner 127 outputs data indicating the determination result to the first update time setter 124.

Examples of data that may be used as the in-area presence/absence data include: motion detection data output from the sensor device 105*d*, operation state data of the air conditioners 105*b* and 105*c*, power consumption data output from the power measuring apparatus 102, traffic volume data indicating the volume of data traffic taking place through the home network 103, and the like. The traffic volume data is output from, for example, a communication device (not illustrated) relaying data traffic taking place through the home network 103. When the operation state data of the air conditioners 105b and 105c is used as the in-area presence/absence data, the in-area presence/absence determiner 127 may determine that the user is present in the house if, for example, the air conditioners 105b and 105c are in an operation such as air-conditioning, heating, dehumidification and the like, and may otherwise determine that the user is not present in the house. When the power consumption data or traffic volume data is used as the in-area presence/absence data, the in-area presence/absence determiner 127 may determine that the user is present in the house if a value indicated by the data is higher than a threshold, and may determine that the user is not present in the house if the value indicated by the data is equal to or lower than the threshold.

The in-section presence/absence determiner 128 determines whether the user is present in a specific room prior to the second update time set by the second update time setter 126 on the basis of in-section presence/absence data indicating whether the user is present in the specific room.

Specifically, the in-section presence/absence determiner 128 continuously determines whether the user is present in a specific room on the basis of the in-section presence/absence data from 30 minutes prior to the second update time set by the second update time setter 126. The in-section presence/absence determiner 128 outputs data indicating the determination result to the second update time setter 126.

Examples of data that may be used as the in-section presence/absence data include: motion detection data output from the sensor device 105d, operation state data of the air conditioners 105b and 105c, and the like. When the operation state data of the air conditioners 105b and 105c is used as the in-section presence/absence data, the in-section presence/absence determiner 128 may determine that the user is present in the room where the air conditioner 105b or 105c is installed if, for example, the air conditioner 105b or 105c is executing an operation such as air-conditioning, heating, dehumidification and the like, and otherwise may determine that the user is not present in the room where the air conditioner 105b or 105c is installed. Moreover, when the TV 105a, air conditioners 105b and 105c, and the like is equipped with a motion sensor, motion detection data output from the motion sensor may be used as the in-section presence/absence data.

Figure 5:
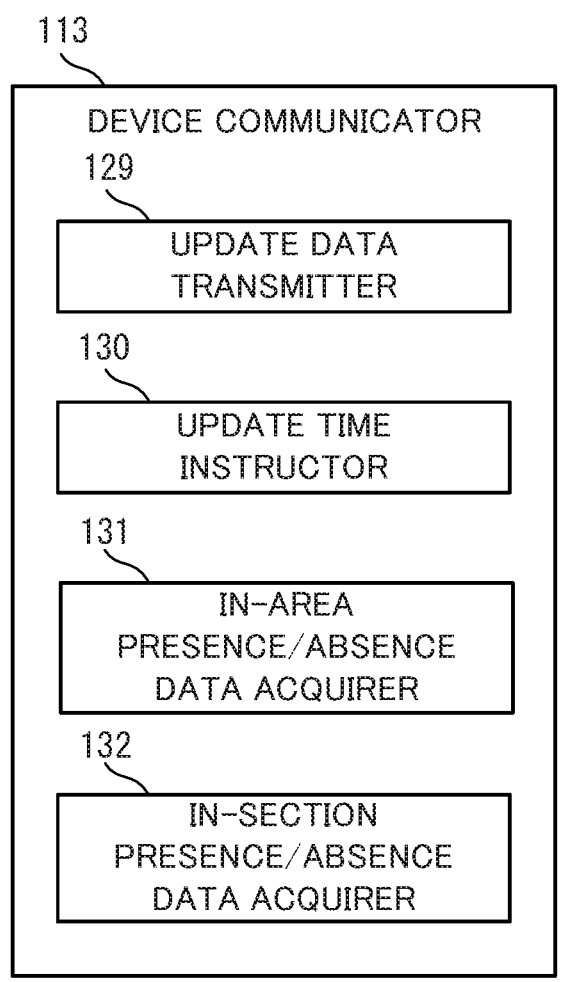
FIG. 5 is a diagram showing the functional configuration of a device communicator according to the embodiment.

The device communicator 113 includes, as illustrated in FIG. 5, an update data transmitter 129 transmitting the second update data to an update target device 105, an update time instructor 130 that provides to the update target device 105 the second update time, an in-area presence/absence data acquirer 131 that acquires the in-area presence/absence data, and an in-section presence/absence data acquirer 132 that acquires the in-section presence/absence data.

In further reference to FIG. 2, the display 116 is, for example, a liquid crystal panel and is, together with the inputter 117, included in a touch panel. Here, the inputter 117 may be a button, switch and the like.

The notifier 114, as the first update time notifier, notifies the user in advance of the first update time set by the first update time setter 124.

Specifically, for example, when the first update time is set by the first update time setter 124, the notifier 114 sends data including the set first update time to the terminal apparatus 110 used by the user before the set first update time. Moreover, for example, when the first update time is re-set by the first update time setter 124, then before the re-set first update time, the notifier 114 sends data, including the re-set first update time and a notice of the first update time being re-set, to the terminal apparatus 110 used by the user.

When the updater 125 completes the first update procedure, the notifier 114, as the completion notifier, notifies the user of completion of the management program update. Specifically, for example, when the updater 125 completes the first update procedure, the notifier 114 sends data, including a notice of completion of the management program update, to the terminal apparatus 110 used by the user.

The notifier 114, as the second update time notifier, notifies the user in advance of the second update time set by the second update time setter 126.

Specifically, for example, upon setting of the second update time by the second update time setter 126, the notifier 114, before the set second update time, sends data including the set second update time to the terminal apparatus 110 used by the user. Moreover, for example, upon re-set of the second update time by the second update time setter 126, before the re-set second update time, the notifier 114 sends data, including the re-set second update time and a notice of the second update time being re-set, to the terminal apparatus 110 used by the user.

As illustrated in FIG. 2, data stored in the storage 118 includes: user schedule data 133 indicating a user schedule, device setting data 134 indicating information set for each of the devices 105, device schedule data 135 indicating a device schedule, user setting data 136 indicating information set by the user in regard to acquisition and update of the first update data and second update data, periodic processing data 137 indicating the results of the periodic procedures executed by the periodic processor 121, management program data 138 including the running management program, and the like.

Figure 6:
FIG. 6 is a chart showing an example of user schedule data.

Upon the inputter 117 receiving an instruction to set a user schedule entered by the user, the controller 112 is used to store the user schedule data 133 in the storage 118. As illustrated in FIG. 6, the user schedule of the present embodiment associates the scheduled content, scheduled time, and the user who is the subject of the schedule.

Figure 7:
FIG. 7 is a chart showing an example of device setting data.

The device setting data 134 is set as appropriate at a time of installation of the devices 105 and the like. As illustrated in FIG. 7, the device setting data 134 of the present embodiment associates device names, which are the names given to the devices 105 by the user or the like as appropriate, addresses of the devices 105 on the home network 103, and installation locations of the devices 105 in the house.

For example, the device schedule setter 122, when the user schedule data 133 is set, sets a device schedule on the basis of the user schedule indicated by the user schedule data 133, predetermined rules, and information presented by the device setting data 134. The device schedule setter 122, upon setting of the device schedule, stores the device schedule data 135 in the storage 118.

In the device schedule data 135 according to the present embodiment, as illustrated in FIG. 8, associates target devices 105 that are the devices 105 to be controlled, control contents that are the contents of the control, and control times that are times to execute the control. The device schedule data 135 illustrated in FIG. 8 indicate a device schedule created by applying the above-described Rules 1 to 4 to the content of the user schedule data 133 illustrated in FIG. 6, and to the content of the device setting data 134 illustrated in FIG. 7.

Figure 9:
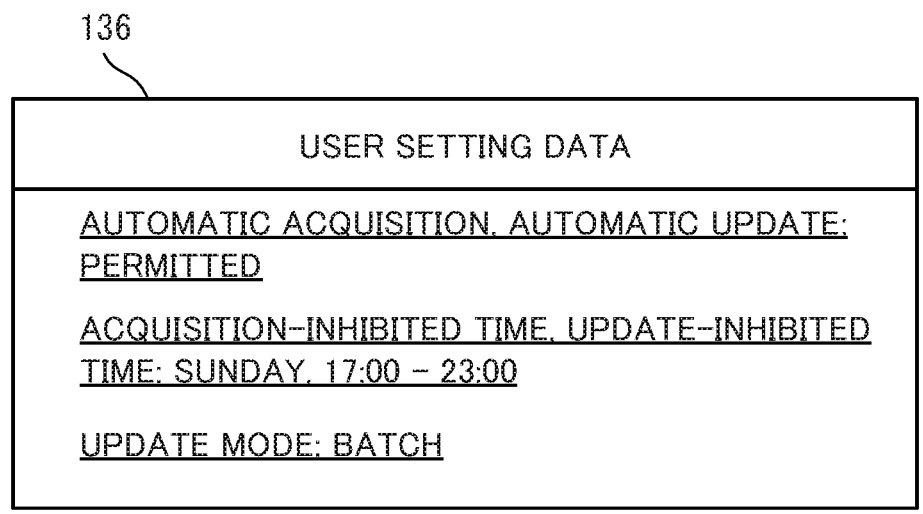
FIG. 9 is an illustration showing an example of user setting data.

The user setting data 136 is saved in the storage 118 by the controller 112 on the basis of a user instruction received by the inputter 117 or terminal instruction receiver 115. The user setting data 136 according to the present embodiment includes, as illustrated in FIG. 9, information indicating whether to permit or inhibit automatic acquisition and automatic update, information indicating times in which acquisition by the first acquirer 119 and second acquirer 120 is forbidden and times in which update by the updater 125 is forbidden, and information indicating an update mode.

When automatic acquisition and automatic update are forbidden, the device management apparatus 100 acquires the first update data and second update data only at a time specified by the user or upon reception of user permission. When automatic acquisition and automatic update are permitted, the device management apparatus 100 automatically acquires the first update data and second update data.

The time in which automatic acquisition and automatic update is inhibited may be set, for example, to a time slot in which the user is highly likely to be present in the house.

The update mode indicates the method of updating the device programs and includes a batch mode and an individual mode. Under the batch mode, the indicated updating method, in the case of there being a plurality of update target devices 105, executes the second update procedure collectively. Under the individual mode, the indicated updating method, in the case of there being a plurality of update target devices 105, causes device-by-device execution of the second update procedure.

When the batch mode is set as illustrated in the example of FIG. 9, the second update time setter 126 sets a second update time in common for the multiple update target devices 105. When the individual mode is set, the second update time setter 126 sets an individual second update time for each of the update target devices 105. The individual second update time means a second update time set independently for each update target device 105, and such setting may result in the set times being the same time.

Here, the user setting data 136 may include times in which acquisition by the first acquirer 119 and second acquirer 120 is permitted and times in which update by the updater 125 is permitted, in addition to, or in place of, times in which automatic acquisition and automatic update are forbidden. The times in which automatic acquisition and automatic update are permitted may be set, for example, to a time slot in which the user is highly likely to be absent from the house.

The periodic processor 121 stores the periodic processing data 137 in the storage 118.

Figure 10:
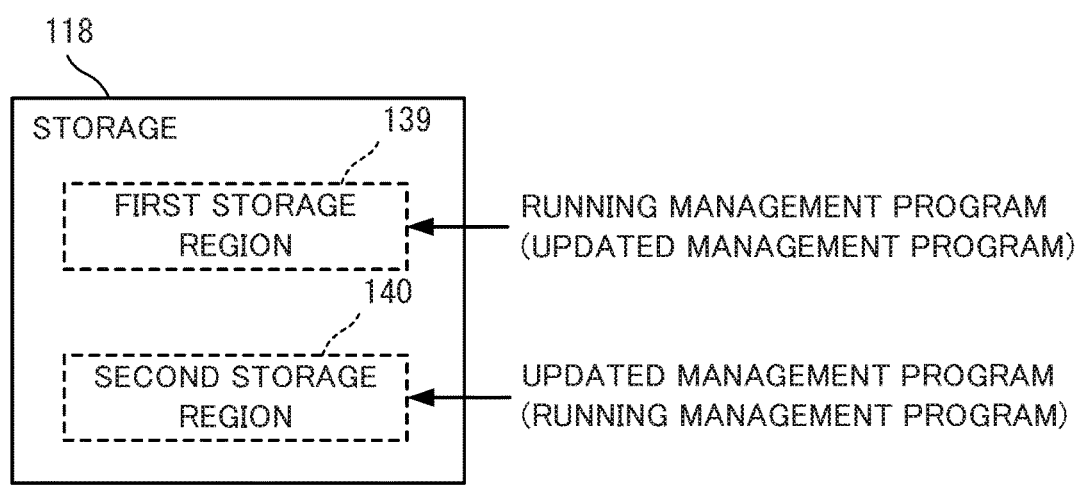
FIG. 10 is a diagram showing the configuration of storage regions in which a management program is stored within the storage region of a storage.

The management program data 138 includes the running management program, and when the first update data is downloaded, further includes a new management program that is based on the first update data. The storage 118 according to the present embodiment has, as illustrated in FIG. 10, a first storage region 139 and a second storage region 140 as storage regions for storing the management program data 138. The running management program is stored in one of the first storage region 139 and the second storage region 140, and the new management program is stored in the other of the first storage region 139 and the second storage region 140.

Specifically, the updater 125 stores the new management program in one of the first storage region 139 and second storage region 140, where the running management program is not stored. In other words, the updater 125 saves the new management program in the second storage region 140 when the running management program is stored in the first storage region 139, and saves the new management program in the first storage region 139 when the running management program is stored in the second storage region 140. Then, the updater 125 retains execution target data indicating in which region the new management program is saved, the first storage region 139 or second storage region 140. The updater 125 executes the first update procedure on the basis of the retained execution target data. As a result, even upon restart following shutdown of the running management program, the updater 125 determines, on the basis of the execution target data, in which region the new management program is saved, the first storage region 139 or second storage region 140, and executes the new management program upon restart. Moreover, in the event that the new management program cannot be executed, the updater 125 can execute the management program in the storage region different from the storage region indicated by the execution target data, namely the management program executed before the restart. Such configuration enables prevention of stoppage of operation of the device management apparatus 100, even if the updating of the management program fails.

Configuration of the device management apparatus 100 is described above. Operation of the device management apparatus 100 is described hereafter. A case is described below in which the data 133 to 136 illustrated in FIGS. 6 to 9 are stored in the storage 118. Moreover, the following description is summarized in FIG. 11, which is a chart for description of the first update time setting method.

Figure 12:
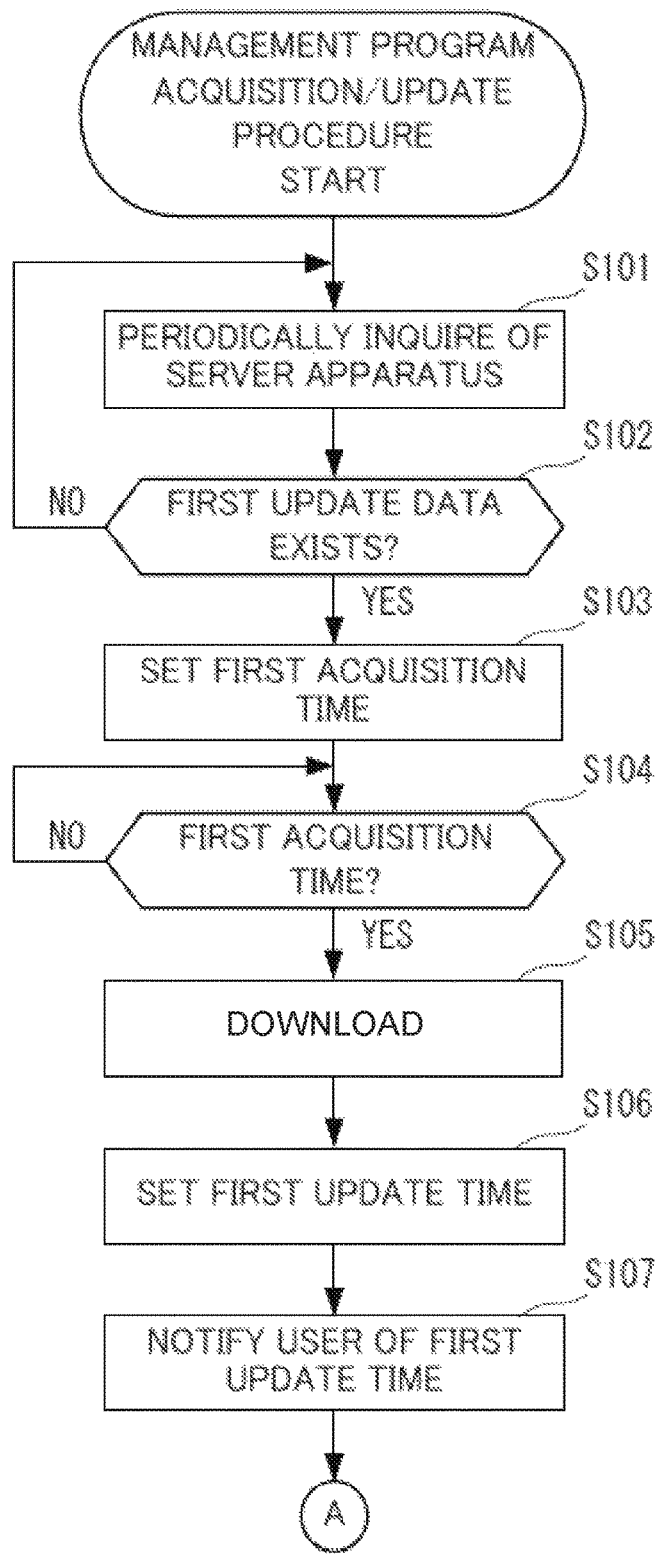
FIG. 12 is a flowchart showing the process flow of a management program acquisition/update procedure according to the embodiment.

While automatic acquisition and automatic update are permitted on the basis of the user setting data 136, the device management apparatus 100 repeatedly executes the management program acquisition/update procedure illustrated in FIG. 12. The management program acquisition/update procedure is a procedure to download first update data for updating the management program and update the running management program by use of the first update data.

Figure 11:
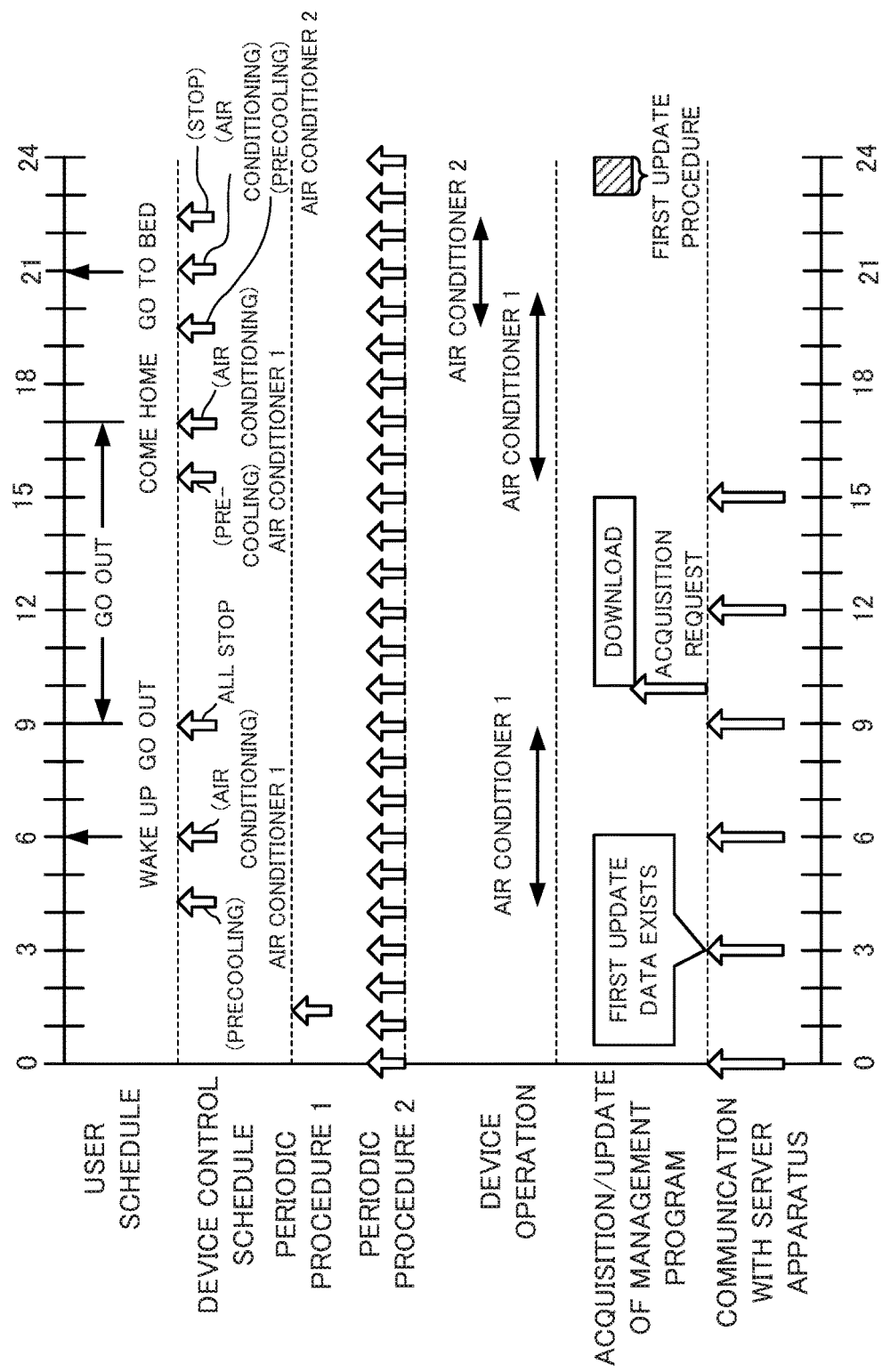
FIG. 11 is a chart for explaining a first update time setting method.

As illustrated in FIG. 12, the first acquirer 119 periodically queries the server apparatus 109, asking whether the first update data for updating the running management program is present or absent (step S101). For example, as illustrated in FIG. 11, the first acquirer 119 quires the server apparatus 109 every three hours.

If no response indicating the presence of first update data is acquired from the server apparatus 109, the first acquirer 119 determines that the first update data does not exist (NO in step S102) and executes the processing of step S101 again.

If a response indicating the presence of first update data is acquired from the server apparatus 109, the first acquirer 119 determines that the first update data exists (YES in step S102) and sets a first acquisition time (step S103). The first acquisition time is a time to start downloading the first update data and is expressed as a point in time or the like. The first acquisition time may be set by the same method as the above-described method of setting the first update time by the first update time setter. Thus in the example illustrated in FIG. 11, in the case in which the first acquirer 119 determines that the first update data exists at 3:00 o'clock, the first acquisition time is determined to be 10 o'clock.

The first acquirer 119 determines whether the first acquisition time determined in step S103 has arrived (step S104). If the first acquirer 119 determines that the first acquisition time has not arrived (NO in step S104), the first acquirer 119 continues to execute step S104.

If the first acquirer 119 determines that the first acquisition time has arrived (YES in step S104), the first acquirer 119 downloads the first update data from the server apparatus 109 (step S105), and the updater 125 saves in the storage 118 the new management program that is based on the downloaded first update data.

The first update time setter 124 sets the first update time on the basis of the user schedule data 133, device schedule data 135, times for the periodic processor 121 to execute the periodic procedures, and the like (step S106). In the case illustrated in FIG. 11, the first update time is set to 23:00 o'clock on the basis of the user schedule data 133 illustrated in FIG. 6, the device schedule data 135 illustrated in FIG. 8, and the times to execute the periodic procedures 1 and 2. As just described, in the present embodiment, the first update data is downloaded at the first acquisition time set in step S103 (step S105), a new management program on the basis of the downloaded first update data is stored in the storage 118, and then the first update time setter 124 sets the first update time. Therefore, the first update time is set so that the first acquirer 119 completes acquisition of the first update data by the first update time and the new management program is saved in the storage 118 by the first update time. Due to this processing, execution of the first update procedure at the first update time is ensured.

The notifier 114 notifies the user of the first update time set in step S106 (step S107). Due to this notification, the user can acknowledge the first update time before execution of the first update procedure.

Figure 13:
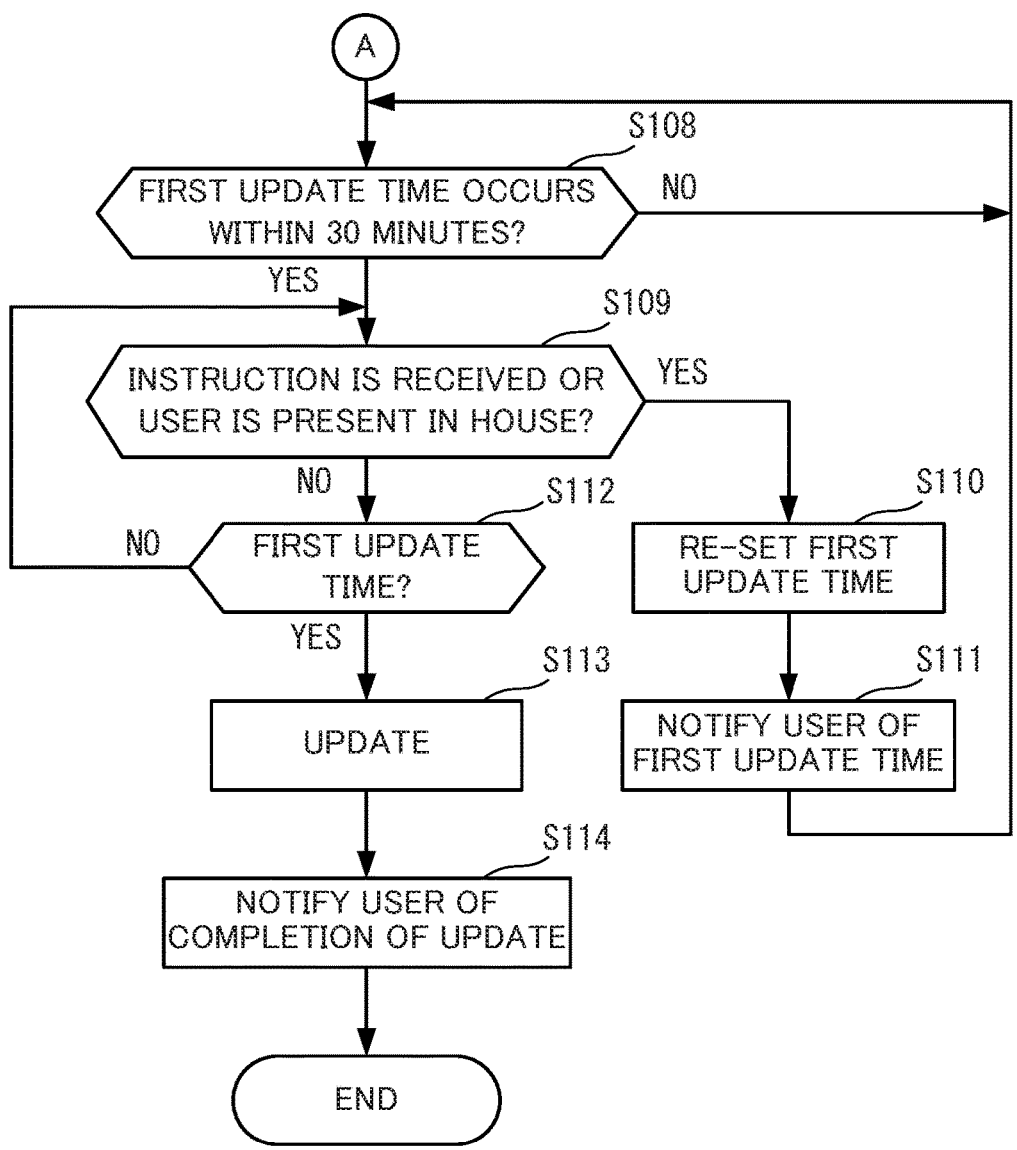
FIG. 13 is a flowchart showing the process flow of the management program acquisition/update procedure according to the embodiment.

As illustrated in FIG. 13, the first update time setter 124 determines whether the first update time set in step S106 occurs within 30 minutes (step S108). If the first update time setter 124 determines that the first update time does not occur within 30 minutes (NO in step S108), the first update time setter 124 continues to execute the processing of step S108.

If the first update time setter 124 determines that the first update time occurs within 30 minutes (YES in step S108), the first update time setter 124 determines whether a user instruction is received or the user is present in the house (step S109). The determination of whether a user instruction is received is made on the basis of whether the inputter 117 or terminal instruction receiver 115 has received a user instruction. Moreover, the determination of whether the user is present in the house is made on the basis of the determination result of the in-area presence/absence determiner 127.

If the first update time setter 124 determines that the user instruction is received or that the user is present in the house (YES in step S109), the first update time setter 124, by the same method as in step S106, re-sets the first update time to a time later than the first update time set in step S106 (step S110). Such processing enables delay of the first update time when the first update time setter 124 determines that a user instruction is received. Moreover, when the user is present in the house, which is a time at which the possibility of receiving the user instruction is higher than when the user is absent, the first update time can be delayed. Thus it is possible to reduce the chance of the user failing to give an instruction to the device management apparatus 100 because the device management apparatus 100 is in the middle of executing the first update procedure. Thus experience of less convenience or less comfort by the user due to the update of the running management program can be prevented.

The notifier 114 notifies the user of the first update time set in step S110 (step S111). Such processing enables the user, before the first update procedure is executed, to be aware of the re-set of the first update time and the re-set first update time.

If the first update time setter 124 determines that no user instruction is received and the user is absent from the house (NO in step S109), the updater 125 determines whether the first update time set last in step S106 and in step S111 has arrived (step S112). If the updater 125 determines that the first update time has not arrived (NO in step S112), the first update time setter 124 continues to execute the processing of step S109.

If the updater 125 determines that the first update time has arrived (YES in step S112), the updater 125 executes the first update procedure. As a result, the running management program is updated to the new management program (step S113).

The notifier 114 notifies the user of completion of the update of the management program (step S114). As a result, the user can know that the update of the management program is completed. The device management apparatus 100 ends execution of the management program acquisition/update procedure.

As described above, in the present embodiment, the first update procedure to update the running management program to the new management program is executed at the first update time set by the first update time setter 124. The first update time is set to a time outside the scheduled times of specific procedures, and thus it is possible to suppress the influence of execution of the first update procedure on execution of the specific procedures, such as failed execution of a specific procedure because of execution of the first update procedure. Therefore, it is possible to suppress the influence of the update of the running management program on the operation of the device management apparatus 100 for energy consumption management.

Moreover, the first update time is set to a time at which the user is forecast, on the basis of the user schedule indicated by the user schedule data 133, to be absent from the house. The devices 105 are unlikely to be operated by the user while the user is absent from the house, and thus it is possible to reduce the chance of the device 105 not being controlled or monitored by the device management apparatus 100 because the first update procedure is in progress at the time of the user operating the device 105. Thus it is possible to suppress the influence of the update of the running management program on the operation of the device management apparatus 100 for energy consumption management.

Figure 14:
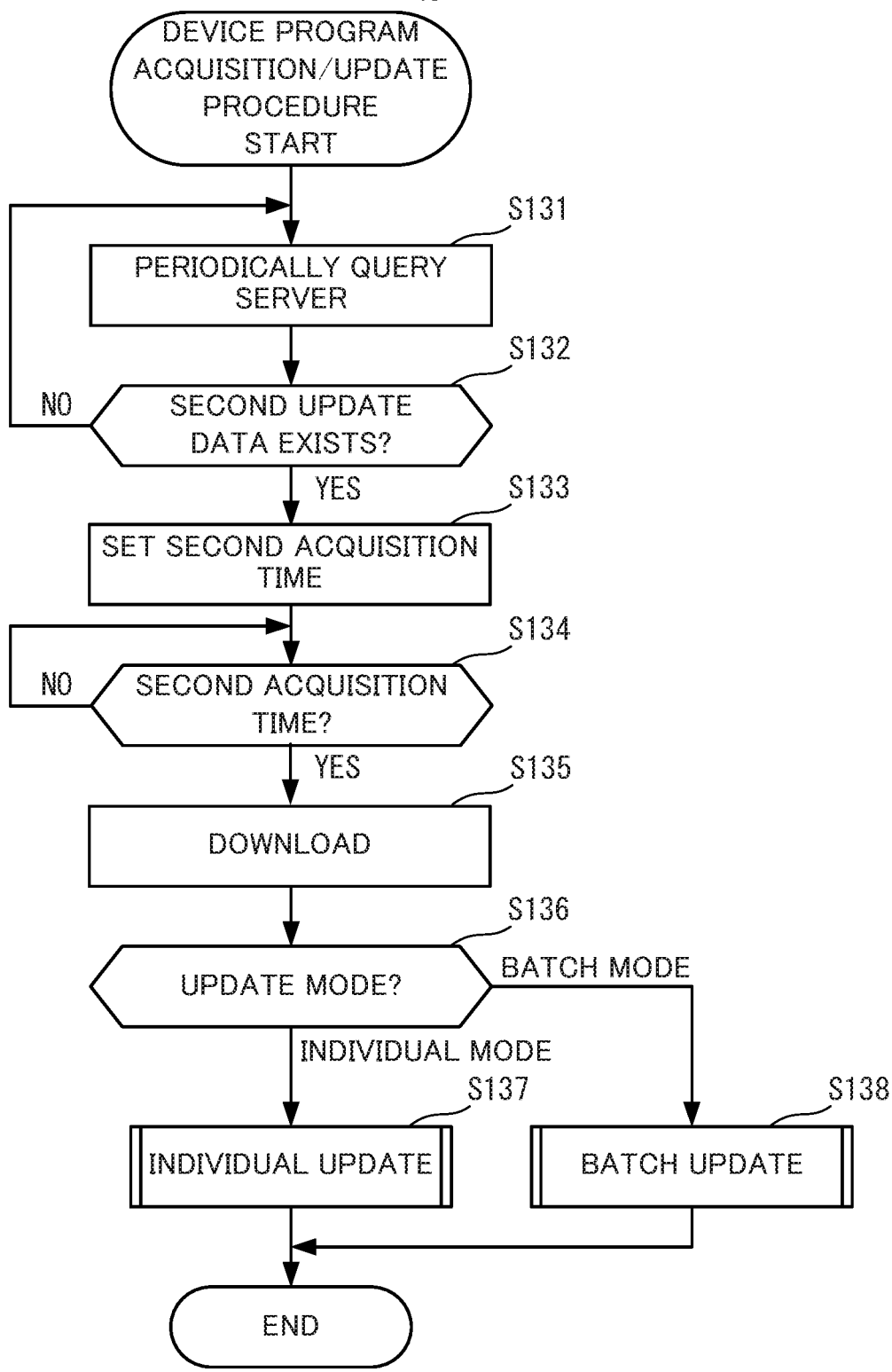
FIG. 14 is a flowchart showing the process flow of a device program acquisition/update procedure according to the embodiment.

While automatic acquisition and automatic update are permitted on the basis of the user setting data 136, the device management apparatus 100 repeatedly executes the device program acquisition/update procedure illustrated in FIG. 14. The device program acquisition/update procedure is a procedure to download second update data for updating a device program, and to cause the device 105 to update the running device program in accordance with the second update data at the second update time.

As illustrated in FIG. 14, the second acquirer 120 periodically quires the server apparatus 109 as to whether the second update data for updating the running device program executed by the device 105 is present/absent (step S131).

If no response indicating the presence of second update data is acquired from the server apparatus 109, the second acquirer 120 determines that there is no second update data (NO in step S132) and again executes the processing of step S131.

If a response indicating the presence of second update data is acquired from the server apparatus 109, the second acquirer 120 determines that there is second update data (YES in step S132) and sets a second acquisition time (step S133). The second acquisition time is a time to start downloading the second update data and is expressed by a point in time. The second acquisition time may be set by the same method as the above-described method for the second update time setter to set the second update time.

The second acquirer 120 determines whether the second acquisition time set in step S133 has arrived (step S134). If the second acquirer 120 determines that the second acquisition time has not arrived (NO in step S134), the second acquirer 120 continues to execute step S134.

If the second acquirer 120 determines that the second acquisition time has arrived (YES in step S134), the second acquirer 120 downloads the second update data from the server apparatus 109 (step S135), and stores the downloaded second update data in the storage 118.

The second update time setter 126 determines the update mode received from the user on the basis of the user setting data 136 (step S136). If the update mode of the user setting data 136 indicates the individual mode (INDIVIDUAL MODE in step S136), the device management apparatus 100 executes the individual update procedure (step S137). If the update mode of the user setting data 136 indicates the batch mode (BATCH MODE in step S136), the device management apparatus 100 executes the batch update procedure (step S138).

Figure 15:
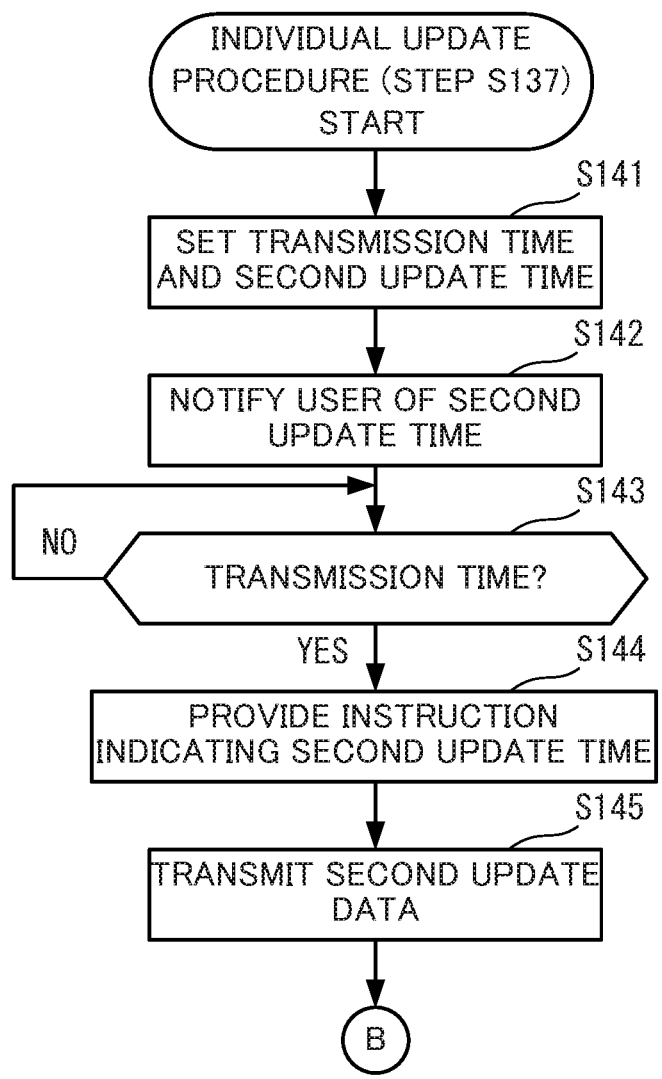
FIG. 15 is a flowchart showing the process flow of an individual update procedure illustrated in FIG. 14.

FIG. 15 is a flowchart showing details of the individual update procedure (step S137).

In the case in which there is a plurality of update target devices 105, the individual update procedure is executed for each update target device 105. In such a case, the individual update procedure may be executed for the update target devices 105 in parallel.

As illustrated in FIG. 15, the second update time setter 126 sets a transmission time and a second update time on the basis of the user schedule data 133, device schedule data 135, times for the periodic processor 121 to execute the periodic procedures, and the like (step S141). Here, the transmission time is a time to send the second update data acquired in step S135 to the update target devices 105. In this manner, in the present embodiment, the second update data is downloaded at the second acquisition time set in step S133 (step S135), the downloaded second update data is stored in the storage 118, and then the second update time setter 126 sets the second update time. Therefore, the second update time is set so that the second acquirer 120 completes acquisition of the second update data by the second update time. As a result, execution of the second update procedure at the second update time is ensured.

The notifier 114 notifies the user of the second update time set in step S141 (step S142). Such notification enables the user, before the second update procedure is executed, to know the second update time.

The update time instructor 130 determines whether the transmission time set in step S141 has arrived (step S143). If the update time instructor 130 determines that the transmission time has not arrived (NO in step S143), the update time instructor 130 continues to execute step S143.

If the update time instructor 130 determines that the transmission time has arrived (YES in step S143), the update time instructor 130 sends to the update target device 105 an instruction to execute the second update procedure at the second update time set in step S141. As a result, the update time instructor 130 provides to the update target device 105 an instruction indicating the second update time (step S144).

Among the second update data downloaded in step S135, the update data transmitter 129 sends to the update target device 105 the second update data corresponding to the running device program of the update target device 105 (step S145).

Figure 16:
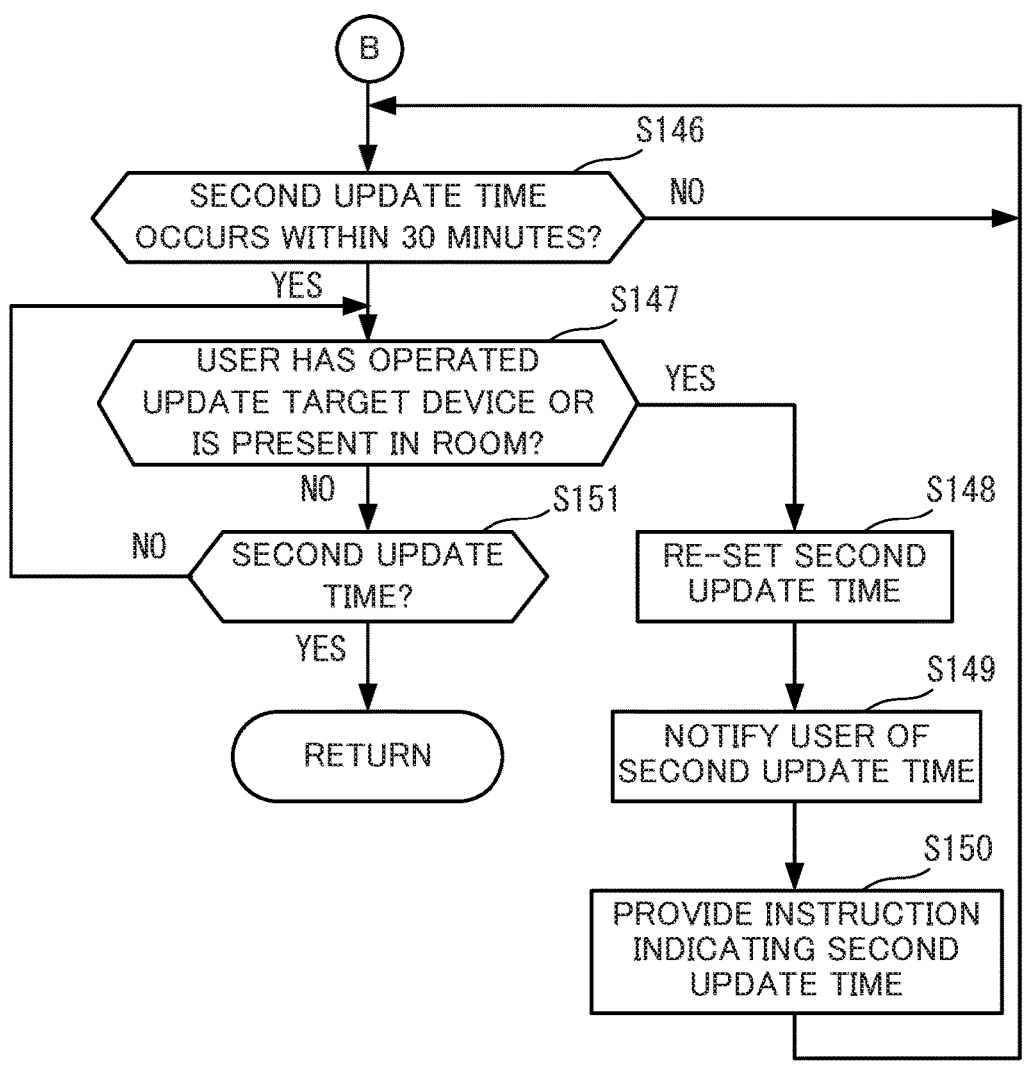
FIG. 16 is a flowchart showing the process flow of the individual update procedure illustrated in FIG. 14.

As illustrated in FIG. 16, the second update time setter 126 determines whether the second update time set in step S141 occurs within 30 minutes (step S146). If the second update time setter 126 determines that the second update time does not occur within 30 minutes (NO in step S146), the second update time setter 126 continues to execute the processing of step S146.

If the second update time setter 126 determines that the second update time occurs within 30 minutes (YES in step S146), the second update time setter 126 determines whether the user has operated the update target device 105 or the user is present in the room where the update target device 105 is installed (step S147). The determination of whether the user has operated the update target device 105 is made, for example, by monitoring whether there is some change in the operation of the update target device 105 other than by control by the device management apparatus 100. Moreover, the determination of whether the user is present in the room is made, for example, on the basis of the determination result of the in-section presence/absence determiner 128.

If the second update time setter 126 determines that the user has conducted an operation, or if the second update time setter 126 determines that the user is present in the room (YES in step S147), by the same method as in step S141, the second update time setter 126 re-sets the second update time to a time later than the second update time set in step S141 (step S148). As a result, the second update time can be delayed when the second update time setter 126 determines that the user has operated the update target device 105. Moreover, when the user is present in the room where the update target device 105 is installed, which is a time at which the possibility of operation of the update target device 105 is higher than when the user is absent, the second update time can be delayed. Consequently, it is possible to reduce the chance of the user failing to operate the device 105 because the device 105 is in the middle of executing the second update procedure. Thus experience of less convenience or less comfort by the user due to the update of the running device program can be prevented.

The notifier 114 notifies the user of the second update time set in step S148 (step S149). As a result, before the second update procedure is executed, the user can know of the re-set of the second update time and can know the re-set second update time. The update time instructor 130 sends to the update target device 105 an instruction to execute the second update procedure at the second update time set in step S148 so as to provide to the update target device 105 an indication of the second update time (step S150). As a result, the update target device 105 dismisses the instruction received by executing the processing of step S144, and executes the second update procedure on the basis of the instruction received by executing the processing of step S150. The second update procedure is, for example, a procedure to execute a new device program upon restart following the end of execution of the running device program.

If the second update time setter 126 determines that the user has conducted no operation and that the user is absent from the room (NO in step S147), the second update time setter 126 determines whether the second update time set last in step S141 and step S148 has arrived (step S151). If the second update time setter 126 determines that the second update time has not arrived (NO in step S151), the second update time setter 126 again executes the processing of step S147.

If the second update time setter 126 determines that the second update time has arrived (YES in step S151), the second update time setter 126 returns to the device program acquisition/update procedure from the individual update procedure. As a result, the device management apparatus 100 ends execution of the device program acquisition/update procedure.

Figure 17:
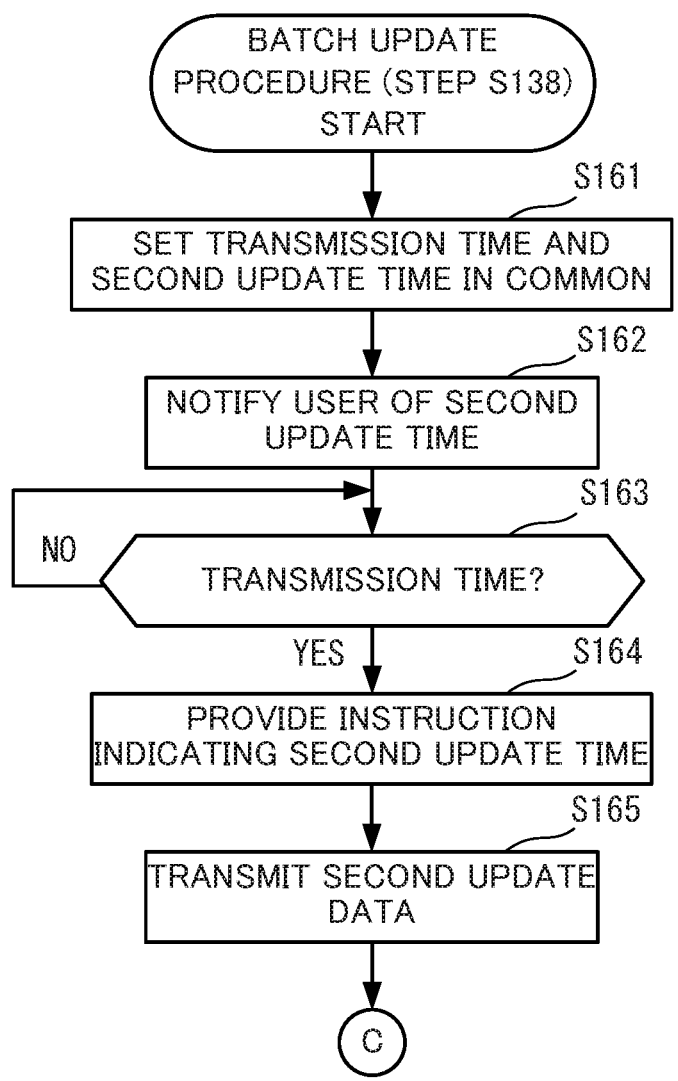
FIG. 17 is a flowchart showing the process flow of a batch update procedure illustrated in FIG. 14.

FIG. 17 is a detailed flowchart illustrating the batch update procedure (step S138).

In the case in which there are multiple update target devices 105, the batch update procedure is executed collectively for a plurality of update target devices 105. Except for this point, the batch update procedure has generally the same process flow as that of the above-described individual update procedure.

As illustrated in FIG. 17, the second update time setter 126 sets a transmission time in common and a second update time in common for a plurality of update target devices 105 on the basis of the user schedule data 133, device schedule data 135, times for the periodic processor 121 to execute the periodic procedures, and the like (step S161). As just described, in the present embodiment, the second update data is downloaded at the second acquisition time set in step S133 (step S135), the downloaded second update data is saved in the storage 118, and then the second update time setter 126 sets the second update time. Therefore, the second update time is set so that the second acquirer 120 completes acquisition of the second update data by the second update time. Such processing ensures execution of the second update procedure at the second update time.

The notifier 114 notifies the user of the second update time set in step S161 (step S162). Such notification enables the user to know the second update time before the second update procedure is executed.

The update time instructor 130 determines whether the transmission time set in step S161 has arrived (step S163). If the update time instructor 130 determines that the transmission time has not arrived (NO in step S163), the update time instructor 130 continues to execute step S163.

If the update time instructor 130 determines that the transmission time has arrived (YES in step S163), the update time instructor 130 sends to all update target devices 105 an instruction to execute the second update procedure at the second update time set in step S161. As a result, the update time instructor 130 provides an instruction of the second update time to all update target devices 105 (step S164).

The update data transmitter 129 sends to each update target device 105, among the second update data downloaded in step S135, the second update data corresponding to the running device program of the update target device 105 (step S165). In step S165, the update data transmitter 129 sends to all update target devices 105 the second update data corresponding to the respective running device program.

Figure 18:
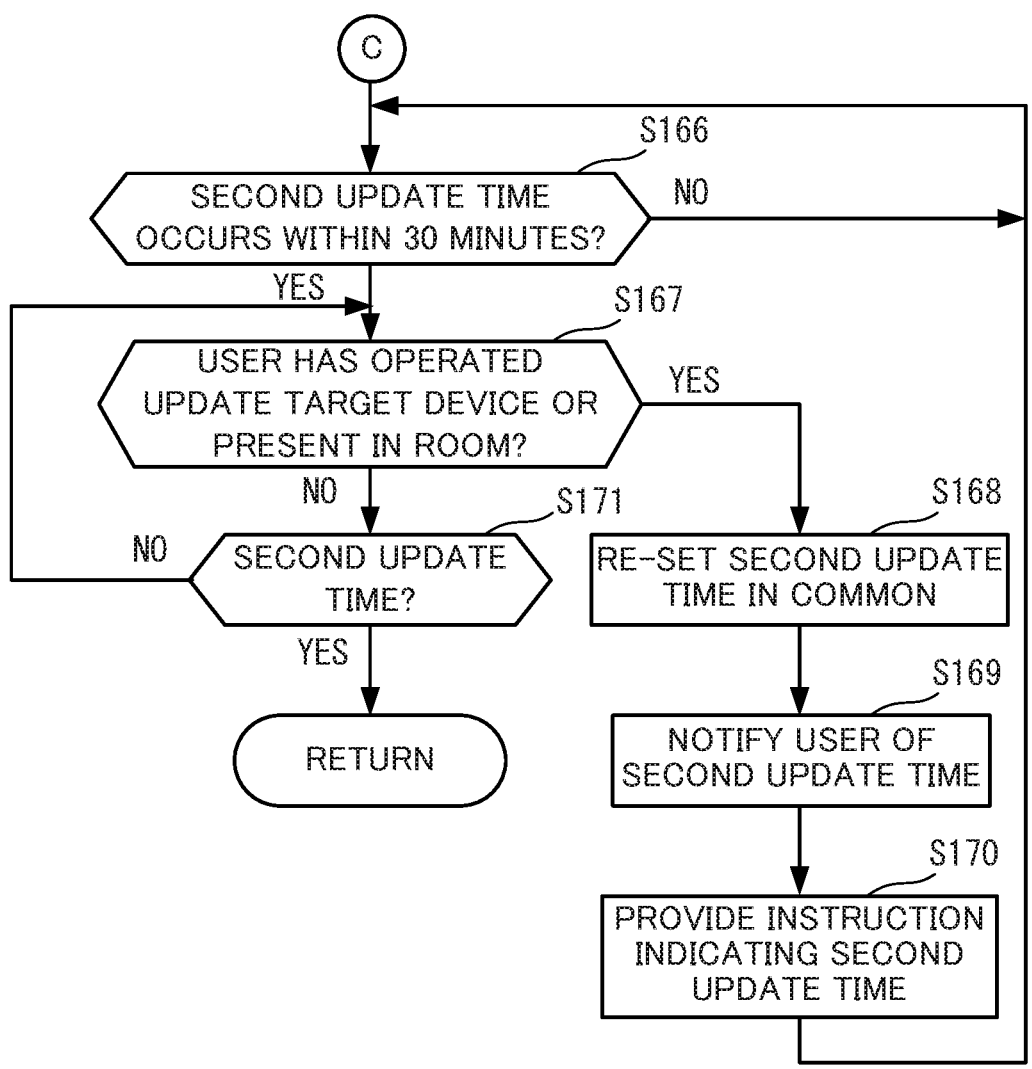
FIG. 18 is a flowchart showing the process flow of the batch update procedure illustrated in FIG. 14.

As illustrated in FIG. 18, the second update time setter 126 determines whether the second update time set in step S161 occurs within 30 minutes (step S166). If the second update time setter 126 determines that the second update time does not occur within 30 minutes (NO in step S166), the second update time setter 126 continues to execute the processing of step S166.

If the second update time setter 126 determines that the second update time occurs within 30 minutes (YES in step S166), the second update time setter 126 determines whether the user has operated the update target device 105 or the user is present in a room where the update target device 105 is installed (step S167).

If the second update time setter 126 determines that the user has operated any of one or more update target devices 105, or if the second update time setter 126 determines that the user is present in one or more rooms where the update target devices 105 are installed (YES in step S167), the second update time setter 126 re-sets the second update time in common for all update target devices 105 by the same method as in step S161 (step S168). Such re-setting enables the second update time to be delayed in the case of determination that the user has operated the update target device 105. Moreover, the second update time can be delayed in cases in which the user is present in a room where the update target device 105 is installed, because in such cases the update target device 105 is more likely to be operated than when the user is absent from the room. Thus it is possible to reduce the chance of the user failing to operate the device 105 because the device 105 is in the middle of executing the second update procedure. Thus experience of less convenience or less comfort by the user due to the update of the running device program can be prevented.

The notifier 114 notifies the user of the second update time set in step S168 (step S169). Such notification enables the user, before the second update procedure is executed, to know of the re-set of the second update time and to know the re-set second update time. The update time instructor 130 sends to all update target devices 105 an instruction to execute the second update procedure at the second update time set in step S168 so as to provide an instruction of the second update time to all the update target devices 105 (step S170). As a result, all the update target devices 105 dismiss the instruction that has been received by executing the processing of step S164, and execute the second update procedure on the basis of the instruction received by executing the processing of step S170.

If the second update time setter 126 determines that the user has operated none of the update target devices 105 and the user is absent from the rooms where the update target devices 105 are installed (NO in step S167), the second update time setter 126 determines whether the second update time set last in step S161 and step S168 has arrived (step S171). If the second update time setter 126 determines that the second update time has not arrived (NO in step S171), the second update time setter 126 again executes the processing of step S167.

If the second update time setter 126 determines that the second update time has arrived (YES in step S171), the second update time setter 126 returns to the device program acquisition/update procedure from the batch update procedure. As a result, the device management apparatus 100 ends execution of the device program acquisition/update procedure.

As described above, the present embodiment executes the second update procedure to update the running device programs to new device programs at the second update time set by the second update time setter 126. The second update time is set to a time outside the scheduled times of specific procedures targeting the update target devices 105. As a result, influence of the second update procedure on a specific procedure, such as failed execution of the specific procedure because of execution of the second update procedure, can be suppressed. This thus enables suppression of influence of update of the running device programs on the operation of the device management apparatus 100 for energy consumption management.

Moreover, the second update time is set to a time at which the user is forecast, on the basis of the user schedule presented by the user schedule data 133, to be absent from the rooms where the update target devices are installed. When the user is absent from a room, the device 105 installed in the room is unlikely to be operated by the user, and thus it is possible to reduce the chance of the user failing to operate a update target device 105 because the second update procedure is in progress when the user operates the update target device 105. Thus experience of less convenience or less comfort by the user due to the update of the running device program can be prevented.

The user can select a device program update mode as either the individual mode or the batch mode. As a result, the user can select an update mode in accordance with family life style and the like of the user. Thus experience of less convenience or less comfort by the user due to the update of the running device program can be prevented.

Although an embodiment of the present disclosure is described above, the present disclosure is not confined to the present embodiment. The embodiment can be modified, for example, as described below. Moreover, the present disclosure includes appropriate embodiments and modified examples, and those further modified as appropriate.

Modified Example 1

For example, on the basis of the data volume of the first update data, first update time setter 124 may estimate a time required for acquiring the first update data. In such a case, the first update time setter 124 may, on the basis of the estimated time required for acquiring the first update data, set the first update time so that the first acquirer 119 completes acquisition of the first update data by the first update time. Setting in this manner enables secure execution of the first update procedure at the first update time.

Modified Example 2

For example, on the basis of the data volume of the first update data, the first update time setter 124 may estimate a time required for saving in the storage 118 a new management program on the basis of the first update data. In such a case, the first update time setter 124 may set the first update time, on the basis of the estimated time required for saving the new management program, so that the new management program is saved in the storage 118 by the first update time. Setting in this manner enables secure execution of the first update procedure at the first update time.

Modified Example 3

For example, the second update time setter 126 may estimate a time required for acquiring the second update data, for example, on the basis of data volume of the second update data. In such a case, the second update time setter 126 may set the second update time for each of update target devices 105 on the basis of the estimated time required for acquiring the second update data, so that the second acquirer 120 completes acquisition of the second update data as described above by the second update time. Setting in this manner enables secure execution of the second update procedure at the second update time.

Modified Example 4

For example, on the basis of the data volume of the second update data, the second update time setter 126 may estimate a time required for saving the second update data in the storage 118. In such a case, the second update time setter 126 may set the second update time on the basis of the estimated time required for saving the second update data, so that the second update data is saved in the storage 118 or in the storage 118 of the update target device 105 by the second update time. Setting in this manner enables secure execution of the second update procedure at the second update time.

Modified Example 5

For example, one or more devices 105 may include a communication adapter installed for communication via the home network 103. In such a case, if the second update data acquired by the second acquirer 120 is data for updating the device program executed by the communication adapter of one or multiple update target devices 105, the second update time setter 126 may set the second update time to a time for which execution of a specific procedure targeting the update target devices 105 is scheduled. When the device program executed by the communication adapters of the update target devices 105 is updated, although there is a possibility of temporary stoppage of the communication function of the update target device 105, the second update procedure is unlikely to affect the function of the device 105. Thus in such a case, even if the second update time is set to a time for which execution of a specific procedure is scheduled, suppression is possible of the influence of the update of the running device program on operations for exerting intrinsic functions of the device 105.

INDUSTRIAL APPLICABILITY

The present disclosure can be used with advantage for device management apparatuses and the like that monitor and manage devices, and thereby manage energy consumption. The present disclosure can be used with advantage with program update methods for updating management programs executed by device management apparatuses, programs for realizing the functions as such device management apparatuses, recording media on which such programs are recorded, and the like.

The invention claimed is:
1. A device management apparatus, comprising:
a processor configured to
    determine a first update time at which to update a running management program, wherein the first update time is outside a scheduled time of execution of a specific procedure, and the running management program is for managing one or more devices in a management target area, and
    at the first update time, update the running management program,
wherein the specific procedure is a procedure for the device management apparatus to control the one or more devices in accordance with a device schedule set in accordance with a user schedule,
    determine whether a user is present in the management target area prior to the first update time in accordance with in-area absence/presence data, the in-area absence/presence data changing depending on whether the user is present in, or absent from, the management target area,
    when the user is determined to be present, re-set the first update time to a time later than the set first update time, and
    update the running management program at the re-set first update time.
2. The device management apparatus according to claim 1, further comprising:

a storage comprising a first storage region and a second storage region for storage of the running management program and a new management program, wherein the processor is further configured to save the new management program in one of the first storage region and the second storage region in which the running management program is not saved, and update the running management program based on the new management program saved in the one of the first storage region and the second storage region.

3. The device management apparatus according to claim 1, wherein the processor is further configured to execute a periodic procedure, and the specific procedure is the periodic procedure.

4. The device management apparatus according to claim 1, wherein the processor is further configured to acquire first update data for updating the running management program, and the first update time is further set so that the processor completes acquisition of the first update data by the first update time.

5. The device management apparatus according to claim 1, wherein the processor is further configured to notify a user in advance of the first update time.

6. The device management apparatus according to claim 1, wherein the processor is further configured to, upon completing update of the running management program, notify a user of completion of update of the management program.

7. A device management apparatus, comprising:

a processor configured to determine first update time at which to update a running management program, wherein the first update time is outside a scheduled time of execution of a specific procedure, and the running management program is for managing one or more devices in a management target area, acquire second update data of a device program running on each of the one or more devices, send the second update data to one or more update target devices among the one or more devices, the one or more update target devices running device programs that are update targets of the second update data, send to the one or more update target devices an instruction to update the running device program based on the second update data at a second update time outside a scheduled time of execution of the specific procedure targeting each of the one or more update target devices, determine whether a user is present in the management target area prior to the first update time in accordance with in-area absence/presence data, the in-area absence/presence data changing depending on whether the user is present in, or absent from, the management target area, when the user is determined to be present, re-set the first update time to a time later than the set first update time, and update the running management program at the re-set first update time.

8. The device management apparatus according to claim 7, wherein the second update time is further set, in accordance with a user schedule indicated by user schedule data, for each of the one or more update target devices, to a time at which a user is forecast to be absent from a section in which the update target device is installed.

9. The device management apparatus according to claim 7, wherein the second update time is further set, when the second update data is for updating device programs executed by communication adaptors of the one or more update target devices, to a time for which execution of the specific procedure targeting the update target device is scheduled.

10. The device management apparatus according to claim 7, further comprising:

an inputter configured to receive, when there are more than one update target device, input of an update mode selected by a user from among:

a batch mode in which the update target devices update the running device programs collectively, and an individual mode in which the update target devices update the running device programs individually, wherein the second update time is set to a time in common for the update target devices when the update mode received by the inputter is the batch mode, and set to an individual time for each of the update target devices when the update mode received by the inputter is the individual mode.

11. The device management apparatus according to claim 7, wherein the processor is further configured to determine, prior to the second update time, whether a user is present in a specific section of the management target area, in accordance with in-section presence/absence data indicating whether the user is present in the specific section of the management target area, when the user is determined to be present in the specific section, re-set the second update time to a time later than the set second update time for each of the one or more update target devices installed in the specific section, and send to the one or more update target devices installed in the specific section an instruction to update the running device program at the re-set second update time for each of the one or more update target devices.

12. The device management apparatus according to claim 7, wherein the processor is further configured to notify a user in advance of the second update time.

13. A management program update method, comprising:

determining, by a device management apparatus, a first update time at which to update a running management program, wherein the first update time is outside a scheduled time of execution of a specific procedure, and the running management program is for managing one or more devices in a management target area, and at the first update time, updating, by the device management apparatus, the running management program, wherein the specific procedure is a procedure to control the one or more devices in accordance with a device schedule set in accordance with a user schedule, determining, by the device management apparatus, whether a user is present in the management target area prior to the first update time in accordance with in-area absence/presence data, the in-area absence/presence data changing depending on whether the user is present in, or absent from, the management target area, when the user is determined to be present, re-setting, by the device management apparatus, the first update time to a time later than the set first update time, and updating, by the device management apparatus, the running management program at the re-set first update time.

14. A non-transitory recording medium having stored therein a program to cause a computer to execute a method, the method comprising:

determining a first update time at which to update a running management program, wherein the first update time is outside a scheduled time of execution of a specific procedure, and the running management program is for managing one or more devices in a management target area, and at the first update time, updating the running management program, wherein the specific procedure is a procedure to control the one or more devices in accordance with a device schedule set in accordance with a user schedule, determining whether a user is present in the management target area prior to the first update time in accordance with in-area absence/presence data, the in-area absence/presence data changing depending on whether the user is present in, or absent from, the management target area, when the user is determined to be present, re-setting the first update time to a time later than the set first update time, and updating the running management program at the re-set first update time.

15. A device management apparatus comprising:
a processor configured to
determine a first update time at which to update a running management program, wherein the first update time is outside a scheduled time of execution of a specific procedure, and the running management program is for managing one or more devices in a management target area, at the first update time, update the running management program, and save in a storage a new management program updated in accordance with first update data for updating the running management program, wherein the first update time is set so that the new management program is saved in the storage by the first update time, determine whether a user is present in the management target area prior to the first update time in accordance with in-area absence/presence data, the in-area absence/presence data changing depending on whether the user is present in, or absent from, the management target area, when the user is determined to be present, re-set the first update time to a time later than the set first update time, and update the running management program at the re-set first update time.

16. A device management apparatus comprising:
a processor configured to
determine a first update time at which to update a running management program, the running management program being for managing one or more devices in a management target area, and at the first update time, update the running management program, wherein the first update time is set to a time outside a scheduled time of execution of a specific procedure and at which a user is forecast, in accordance with a user schedule, to be absent from the management target area, determine whether a user is present in the management target area prior to the first update time in accordance with in-area absence/presence data, the in-area absence/presence data changing depending on whether the user is present in, or absent from, the management target area, when the user is determined to be present, re-set the first update time to a time later than the set first update time, and update the running management program at the re-set first update time.

17. A device management apparatus comprising:
a processor configured to
determine a first update time at which to update a running management program, wherein the first update time is outside a scheduled time of execution of a specific procedure, and the running management program is for managing one or more devices in a management target area, at the first update time, update the running management program, determine whether a user is present in the management target area prior to the first update time in accordance with in-area absence/presence data, the in-area absence/presence data changing depending on whether the user is present in, or absent from, the management target area, when the user is determined to be present, re-set the first update time to a time later than the set first update time, and update the running management program at the re-set first update time.

* * * * *